United States Patent [19]

Martin

[11] Patent Number: 5,218,667
[45] Date of Patent: Jun. 8, 1993

[54] LOW-WATTAGE ELECTRIC DISPLACEMENT WATER HEATING APPARATUS

[75] Inventor: John C. Martin, Springfield, Ill.

[73] Assignee: Bunn-O-Matic Corporation, Springfield, Ill.

[21] Appl. No.: 644,844

[22] Filed: Jan. 22, 1991

[51] Int. Cl.⁵ .................. H05B 1/02; A47J 31/54; F24H 1/18
[52] U.S. Cl. ..................... 392/442; 99/281; 99/288; 392/445; 392/459
[58] Field of Search .............. 392/441–448, 392/485, 458, 459; 99/281, 282, 288

[56] References Cited

U.S. PATENT DOCUMENTS

| | | | |
|---|---|---|---|
| 2,013,914 | 9/1935 | Hartmann | 392/459 |
| 2,146,022 | 2/1939 | Losee | 392/442 |
| 2,408,403 | 10/1946 | Babson et al. | 392/442 |
| 2,422,492 | 6/1947 | Losee | 392/459 |
| 2,428,466 | 10/1947 | Palm | 392/459 X |
| 2,448,183 | 8/1948 | Koppel | 392/458 X |
| 2,467,749 | 4/1949 | Hodsdom | 392/442 |
| 2,553,930 | 12/1950 | Harr | 392/445 X |
| 3,220,334 | 11/1965 | Martin | 99/282 |
| 3,691,932 | 9/1972 | Martin | 99/281 |
| 3,736,155 | 5/1973 | Martin | 99/282 |

FOREIGN PATENT DOCUMENTS

| | | | |
|---|---|---|---|
| 40429 | 12/1924 | Norway | 392/444 |
| 417 | of 1915 | United Kingdom | 392/442 |
| 411694 | 6/1934 | United Kingdom | 392/442 |
| 457095 | 11/1936 | United Kingdom | 392/442 |

Primary Examiner—Anthony Bartis
Attorney, Agent, or Firm—Trexler, Bushnell, Giangiorgi & Blackstone, Ltd.

[57] ABSTRACT

A low wattage two-four cup displacement water heating apparatus includes a fill basin positioned above a thermostatically controlled electrically heated water reservoir and communicating therewith through a fill tube extending downwardly from the basin to the lower portion of the reservoir. A dome in communication with the reservoir protrudes upwardly therefrom into the basin. A discharge tube having an entry end located in the dome and positioned approximately the bottom level of the basin extends downwardly through the reservoir to an external discharge end. The dome and a venting tube associated with the discharge tube minimize evaporative water loss from the reservoir through the discharge tube.

7 Claims, 1 Drawing Sheet

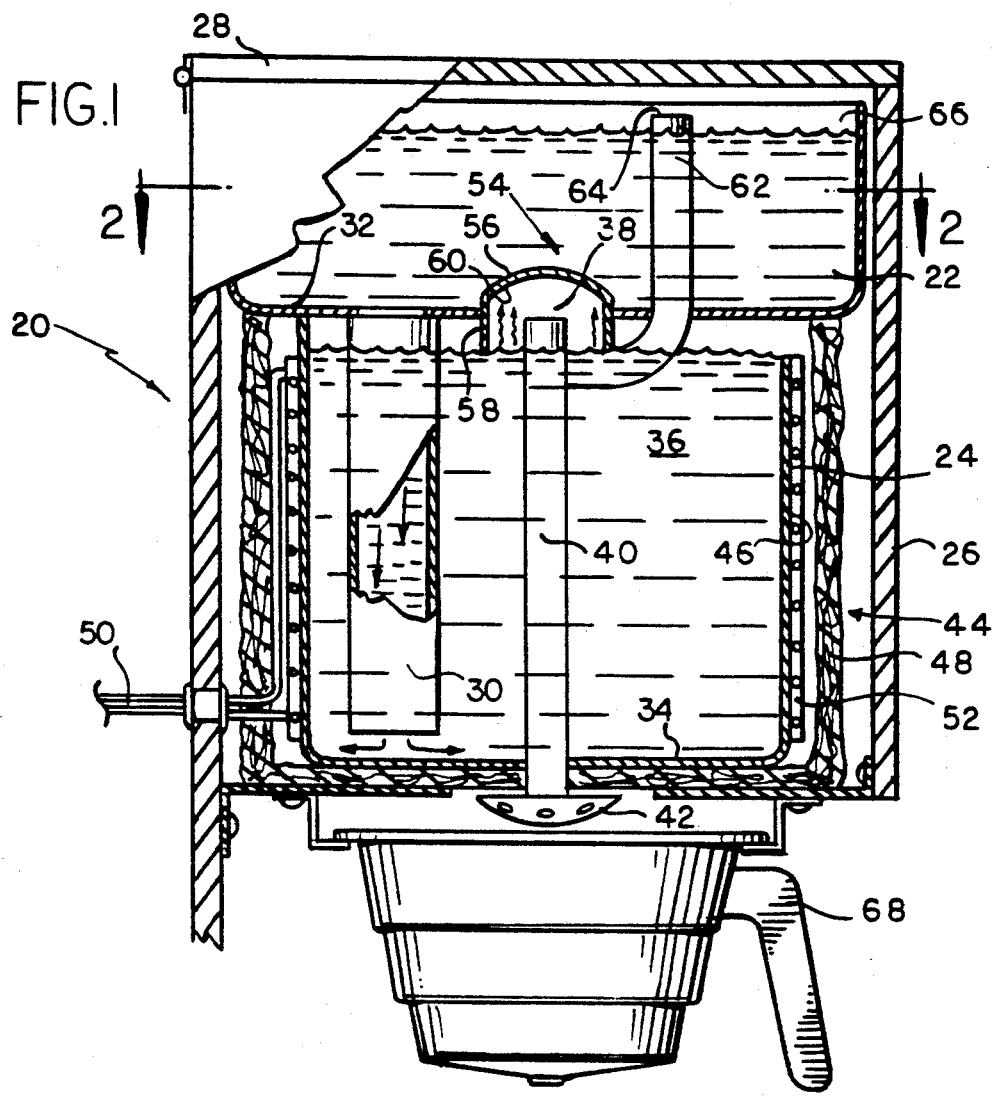
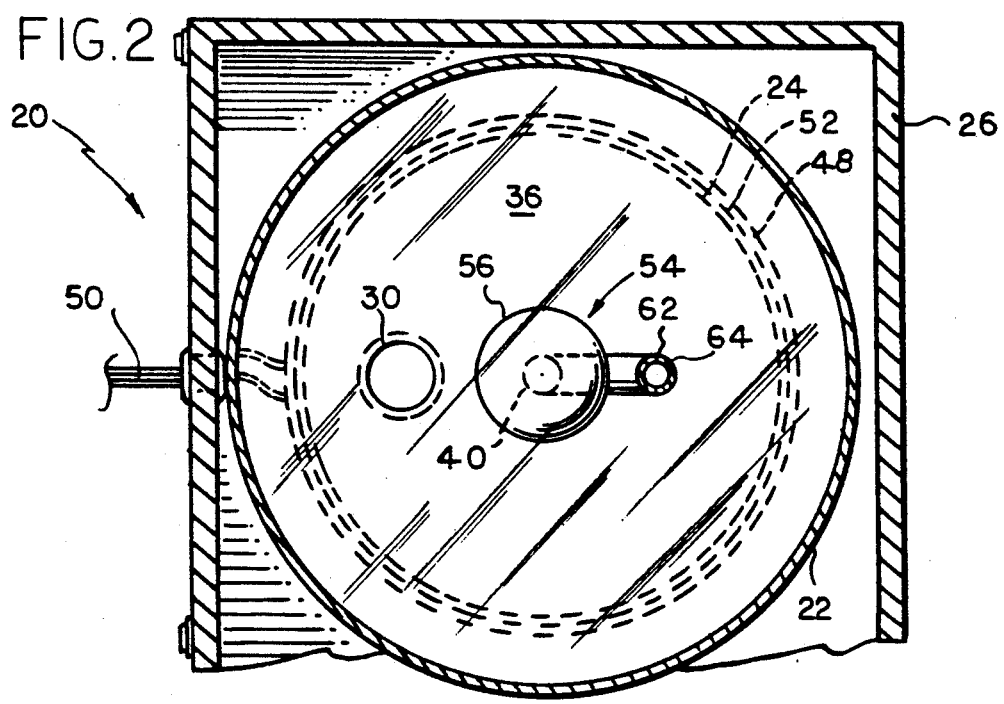

LOW-WATTAGE ELECTRIC DISPLACEMENT WATER HEATING APPARATUS

BACKGROUND OF THE INVENTION

This invention relates to a displacement water heating apparatus for conductively heating a desired volume of water.

Displacement brewing or water heating apparatus are known in the art and provide rapid delivery of heated water on demand. These displacement water heating apparatus include a heated reservoir positioned below and in communication with a fill water basin. A fill tube is connected to the bottom of the fill water basin and extends downwardly into the heated reservoir to deliver fill water to the bottom thereof. The cooler fill water displaces heated water retained in the heated reservoir and forces the heated water out through a discharge tube for delivery to a vessel. The fill water is retained in the heated reservoir and heated to a desired predetermined temperature.

Prior art displacement water heating apparatus have a resistive heating element positioned towards the bottom of the heated reservoir for heating the fill water. Because the fill water enters the heated water reservoir towards the bottom, the fill water contacts the heating element and is quickly heated. The resistive heating element is controlled by a thermostatic control device which includes a temperature probe extending into the heated reservoir. Thermostatic control is achieved by any conventional means such as bimetalic thermostatic controls, thermocouples or thermistors.

While the displacement water heating apparatus have achieved commercial success, these devices are limited in their use for the preparation of small quantities of heated water in low frequency of use applications. For example, maintaining a large volume of water for a single use per day application is inefficient in terms of the cost of the apparatus and the energy consumption of such an apparatus. Such low frequency of use applications are readily found in the home as well as in commercial settings.

For example, individuals may desire a heated beverage as well as a serving hot cereal for a morning breakfast and require only a maximum of approximately 4 cups of heated water for such purpose. Another example of such an application of low frequency, low volume heated water use is in the hotel/motel business. In a hotel, it is desirable to provide guests with heated beverages as a morning "wakeup" beverage. Such a morning wakeup beverage requires no more than approximately 4 cups of heated water to be provided only one time in any 24 hour period.

The typical prior art displacement apparatus is inefficient for use for the low frequency, low volume heated water applications as noted above. Further, attempts to produce smaller versions of the prior art displacement water heating apparatus have failed in part due to high evaporation rates. While the evaporation rate for a typical prior art displacement heated water apparatus is approximately the same for a small or large volume apparatus, the relative effect of evaporative loss on the small volume apparatus is substantially greater. For example, a six ounce evaporative loss from an apparatus having a gallon of heated water in the heated water reservoir is minor compared to six ounces lost from a four cup apparatus.

Heretofore, applicant is unaware of any devices which have overcome these problems resulting in the present invention.

OBJECTS AND SUMMARY OF THE INVENTION

A general object of the present invention is to provide a low frequency of use displacement water heating apparatus having a maximum capacity of four cups which efficiently heats the four cups within a period of time of between 12 to 24 hours.

Another object of the present invention is to provide a low frequency of use displacement water heating apparatus which reduces evaporative water loss from the apparatus.

Yet another object of the present invention is to provide a displacement water heating apparatus which conductively heats water retained in the heated water reservoir.

Still another object of the present invention is to provide a displacement water heating apparatus for low frequency of use applications which does not require a thermostatic control device in order to control heating of the water retained therein.

Briefly, and in accordance with the foregoing, the present invention comprises a low frequency of use water heating apparatus. The apparatus includes a fill basin in communication with a heated water reservoir. Water retained in the heated water reservoir is conductively heated by a conductive heating device surrounding the outside of the heated water reservoir such that when the conductive heating device is electrically energized, heat is dissipated from the conductive heating device to the water retained in the heated water reservoir. The conductive heating device heats a maximum volume of water retained in the heated water reservoir within a 12 to 24 hour period. A venting device is provided to prevent evaporative water loss.

BRIEF DESCRIPTION OF THE DRAWINGS

The organization and manner of the operation of the disclosed embodiment of the invention, together with the further objects and advantages thereof, may be understood best by reference to the following description taken in connection with the accompanying drawings wherein like reference numerals identify like elements in which:

FIG. 1 is a partial fragmentary side sectional view of a low frequency of use water heating apparatus of the present invention; and FIG. 2 is a partial sectional plan view taken along line 2—2 in FIG. 1.

DETAILED DESCRIPTION OF THE ILLUSTRATED EMBODIMENT

While this invention may be susceptible to embodiment in different forms, there is shown in the drawings and will be described herein, a preferred embodiment of the present invention with the understanding that the present disclosure is to be considered an exemplification of the principals of the invention, and is not intended to limit the invention to the embodiment illustrated and described herein.

Referring now to the drawings, wherein like parts are designated by the same reference numerals throughout the FIGS., a low frequency of use displacement water heating apparatus 20 is shown in FIG. 1. A fill basin 22 and a heated reservoir 24 are contained in a housing 26 of the apparatus 20. The fill basin 22 is positioned above the heated reservoir 24 and is accessible by moving a hinged lid 28 positioned thereover. A fill tube 30 extends from a bottom 32 of the fill basin 22 downwardly into the heated reservoir 24 towards, but not contacting, a bottom 34 of the heated reservoir 24. Water 36 is retained in the heated reservoir 24 at a temperature of approximately 15° below boiling.

Water 36 is retained in the heated reservoir 24 while the apparatus 20 is not in use. When heated water is desired, a volume of water, equaling the desired volume of heated water, is disposed in the fill basin 22. The water in the fill basin flows through the fill tube 30 under the force of gravity towards the bottom 34 of the heated water reservoir 24. Since the fill water entering the heated reservoir 24 is at a lower temperature than the water 36 in the reservoir 24, the fill water tends to accumulate towards the bottom 34 of the reservoir 24. Accumulation of the fill water at the bottom 34 of the reservoir 24 creates a displacement action forcing heated water upwardly in the heated reservoir 24 towards an entry end 38 of a discharge tube 40. Once water is displaced and flows into the entry end 38, the water flows through the discharge tube 40 and exits the discharge tube 40 through a discharge end 42.

Typically, prior art displacement water heating apparatus employ a resistive immersion heating element. However, the present invention does not use an immersion heating elements. Rather, external conductive heating means 44 surround an outside surface 46 of the heated reservoir 24. The external heating means or conductive blanket member 44 conducts heat through the heated reservoir 24 to the water 36 contained therein thereby transferring heat energy from the blanket member 44 to the water 36 without immersing a heating element in the water 36. To further increase the efficiency of the conductive heat blanket member 44, an insulating layer 48 surrounds the heated reservoir 24 to direct heat from the conductive blanket member 44 towards the water 36 and to maintain the heat in the reservoir and decrease the cooling rate between the reservoir 24 and the ambient air surrounding the housing 26.

The conductive heating member 44 is a low watt density electric heating device which operates on approximately 15–30 watts. An electric cord 50 provides energy to heating elements 52 spaced throughout the conductive blanket member 44. Although the conductive heating member 44 does not provide rapid reheating of water entering the heated reservoir 24 through the fill tube 30, the low watt density device does provide heating of the contents of the heated reservoir 24 within a 12–24 hour period. Further, the low watt density of the conductive blanket member 44 substantially reduces the risk of fire hazard should the reservoir 24 accidentally become drained. Further, since an immersion resistance heating element is not employed in the present invention, there is no need for thermostatic controls and sensing devices in the present invention. Use of the conductive blanket member 44 in the present invention substantially reduces the cost of production, the number of parts and assemblies employed in production, the time involved in producing a unit as well as improving the reliability of the apparatus.

The apparatus further employs evaporation prevention means 54 to minimize the loss of water 36 retained in the heated reservoir 24 through evaporation. By minimizing evaporative water loss, the evaporation prevention means 54 assures that the apparatus 20 will be ready to provide heated water even though the apparatus 20 has not been used over a reasonable period of time (for example, no use of the apparatus for approximately 4–5 days). The evaporation prevention means 54 includes a dome 56 positioned over the entry end 58 of the discharge tube 40. Further, the dome 56 generally extends into the fill basin 22 to accommodate displacement water flow from the heated reservoir 24 into the discharge tube 40 while maintaining the entry end 38 as close to the bottom 32 of the basin 22.

Vapor (indicated by arrows 58) rises into the dome 56 and either condenses on a top inside surface 60 of the dome 56 and drain back into the reservoir 24, or passes into the discharge tube 40 and are then drafted up through a side tube 62 into the basin 22. A drafting effect is created by air passing through the discharge end 42 upwardly towards the entry end 38 and flowing through the side tube 62 into the basin 22.

Relative positions of the entry end 38 of the discharge tube 40 and the side tube 62 prevent undesired backflow or overflow. For example, the entry end 38 generally extends towards the top of the heated reservoir 24 yet below the bottom 32 of the fill basin 22. This level of the entry end 38 assures that the water in the fill basin 22 will completely drain into the fill tube 30 and into the heated reservoir 24 under the force of gravity. Further, a top end 64 of the side tube 62 is positioned above a maximum fill level 66 of the basin 22 to prevent water from the fill basin 22, which is not heated, from flowing directly into the discharge tube 40. Further, the side tube 62 is shaped and attached to the discharge tube 40 in an upward direction so that any water which backs up in the side tube 62 while water is flowing through the discharge tube 40 may drain to the discharge tube 40 when the flow rate permits.

In use, the apparatus 20 is set up without water in the reservoir 24. Water is disposed into the reservoir 24 whereupon it is heated by the conductive blanket member 44 over a 12–24 hour period. After the initial warm up period, the apparatus 20 may be used to produce up to approximately 4 cups of heated water for prepared beverages or other food requiring heated water.

The hinged lid 28 of the housing 26 is lifted to dispose water into the basin 22 in preparation for dispensing heated water from the apparatus 20. Water poured into the fill basin 22 flows through the fill tube 30 into a bottom portion of the heated reservoir 24 thereby displacing heated water 36 in the reservoir upwardly towards the entry end 38 of the discharge tube 40. Water flowing through the entry end 38 exits the discharge tube 40 through the discharge end 42 into an approximate funnel 68 and into a vessel (not shown) waiting below the discharge end 42.

Once the water in the fill basin 22 has flowed into the heated reservoir 24 and the fill basin 22 is empty, the water 36 and the heated reservoir 24 is heated by the conductive blanket member 44. Heating of the water is made more efficient by surrounding the conductive blanket member 44 surrounding the heated reservoir 24 with an insulation layer 48.

Evaporative loss while the water is heating and while heated water is held until displaced is minimized by evaporation prevention means 54 including a dome 56 and a side tube 62. The dome 56 recycles vapor 58 condensing on a top inside surface 60 thereof and the side tube 62 promotes drafting upwardly through the discharge tube and into the side tube 62 to recycle vapor 58 into the basin 22 which may thereby flow into the fill tube 30.

The present invention eliminates the need for a resistive immersion type heating device and thermostatic control and sensing devices when the frequency of use of the apparatus 20 has a period of approximately 12–24 hours. Further, due to the low use of the apparatus 20, a low watt density conductive blanket member may be employed thereby reducing the energy required to heat and maintain the water in the heated reservoir 24 as well as reduce the safety risks of such an electronic device.

While a preferred embodiment of the present invention is shown and described, it is envisioned that those skilled in the art may devise modifications of the present invention without departing from the spirit and scope of the appended claims.

I claim:

1. A low use frequency displacement water heating apparatus including a fill basin in communication with a heated reservoir positioned therebelow; a fill tube attached to said fill basin and extending therefrom into said heated water reservoir for transferring water from said fill basin to said heated water reservoir; a discharge tube extending from said heated water reservoir for discharging water therefrom when fill water is introduced through the fill tube displacing water in said heated reservoir, said discharge tube having an entry end and a discharge end, said entry end projecting into said heated reservoir and extending above a pre-discharge water level and said discharge end extending from said heated reservoir; a dome portion is attached to a top portion of said heated reservoir extending into said fill basin positioned thereabove, said entry end of said discharge tube extending into said dome to a position approximately equal to a bottom level of said fill basin for assuring complete drainage of said fill basin into said reservoir; said apparatus including external conductive heating means for heating water in said heated reservoir to a predetermined temperature external to said heated reservoir; said apparatus including evaporation prevention means for reducing evaporative losses from said heated reservoir.

2. A low use frequency displacement water heating apparatus according to claim 1, wherein said evaporation prevention means includes said dome positioned over said entry end of said discharge tube and a venting tube in communication with said discharge tube and extending above a full level of said fill basin for interrupting evaporative chimney drafting through said discharge tube.

3. A low use frequency displacement water heating apparatus, said apparatus comprising: a fill basin and a heated water reservoir, said fill basin being positioned above said heated water reservoir; a fill tube extending downwardly through said fill basin and into said heated water reservoir for transferring water disposed in said fill basin to said heated water reservoir; external conductive heating means surrounding at least a portion of an outside surface of said heated water reservoir for heating water in said heated water reservoir to a predetermined temperature; a dome in communication with said heated water reservoir protruding upwardly from heated water reservoir and into said fill basin positioned thereabove; a discharge tube having an entry end and a dispensing end, said discharge tube communicating with said heated water reservoir for dispensing heated water therefrom when displaced by water disposed in said fill basin, an entry end of said discharge tube being located in said dome at a position at least level with a bottom of said dome for assuring complete drainage of said fill basin into said reservoir; and evaporation prevention means operatively associated with said dome portion for reducing evaporative losses from said heated reservoir.

4. A low use frequency displacement water heating apparatus according to claim 3, wherein said evaporation prevention means includes a venting tube having a first end attached to and communicating with said discharge tube and a second end communicating with said fill basin, said second end of said venting tube extending upwardly through said fill basin above a full level of said fill basin for interrupting evaporative chimney drafting through said discharge tube.

5. A low use frequency displacement water heating apparatus including a fill basin in communication with a heated reservoir positioned therebelow, said apparatus comprising; a fill tube attached to said fill basin and extending therefrom into said heated water reservoir for transferring water from said fill basin to said heated water reservoir; a discharge tube extending from said heated water reservoir for discharging water therefrom when fill water is introduced through the fill tube to displace water in said heated reservoir, said discharge tube having an entry end and a discharge end, said entry end positioned in said heated water reservoir and extending up to at least the top of said reservoir, and said discharge end projecting through said heated water reservoir and dispensing heated water therefrom; a venting tube having a first end attached to and communicating with said discharge tube and a second end communicating with said fill basin, said second end of said venting tube extending upwardly through said fill basin above a full level of said fill basin for interrupting evaporative chimney drafting through said discharge tube; an electric conductive blanket member for heating water in said heated reservoir to a predetermined temperature external to said heated reservoir, said conductive blanket member surrounding an outside surface of said heated reservoir and conducting heat to water disposed in said heated reservoir when said blanket member is energized, said apparatus heating water retained in said heated reservoir within approximately 12 to 24 hours of being disposed therein; and an insulating layer covers said electric heating blanket surrounding said heated reservoir for retaining heat energy conducted by said electric heating blanket to water retained in said heated reservoir.

6. A low use frequency displacement water heating apparatus according to claim 5, wherein said electric heating blanket member operates on 15 to 30 watts.

7. A low use frequency displacement water heating apparatus according to claim 5, wherein said fill basin and said heated reservoir have a maximum capacity of approximately 4 cups.

* * * * *